(12) United States Patent
Chhloeum

(10) Patent No.: US 8,002,321 B2
(45) Date of Patent: Aug. 23, 2011

(54) DEVICE FOR PICKING UP LOOSE MATERIAL

(76) Inventor: Vuthy Chhloeum, Scarborough, ME (US)

( * ) Notice: Subject to any disclaimer, the term of this patent is extended or adjusted under 35 U.S.C. 154(b) by 0 days.

(21) Appl. No.: 12/789,066

(22) Filed: May 27, 2010

(65) Prior Publication Data

US 2010/0301621 A1 Dec. 2, 2010

Related U.S. Application Data

(60) Provisional application No. 61/183,097, filed on Jun. 2, 2009.

(51) Int. Cl.
*B25J 1/04* (2006.01)
(52) U.S. Cl. ...................... 294/19.1; 294/100
(58) Field of Classification Search .............. 294/19.1, 294/100, 19.3, 99.1, 115, 116
See application file for complete search history.

(56) References Cited

U.S. PATENT DOCUMENTS

| 233,672 | A | * | 10/1880 | Haley | 294/19.1 |
| 363,437 | A | * | 5/1887 | Thompson | 294/19.1 |
| 1,909,399 | A | * | 5/1933 | Glenny | 209/281 |
| 3,208,786 | A | * | 9/1965 | Eddleman | 294/19.3 |
| 3,929,363 | A | * | 12/1975 | Kahan | 294/1.4 |
| 4,684,128 | A | * | 8/1987 | Verstraeten | 294/115 |

* cited by examiner

*Primary Examiner* — Paul T Chin
(74) *Attorney, Agent, or Firm* — Patricia M. Mathers

(57) ABSTRACT

A leaf grapple for grabbing and lifting a pile of leaves or other loose debris is disclosed. The leaf grapple includes a basket at the end of a handle. The basket has multiple sections, each section being movably attached at the top to a first spider and, some distance away from the top, pivotably attached to a second spider. An actuating rod is assembled in the handle. The first spider is attached to the end of the actuating rod; the second spider is attached to the end of the handle. Pushing on the handle forces the first spider downward, which forces the top portions of the grapple sections downward. The grapple sections pivot about the lower ends of the second spider, which causes the grapple sections to open. Pulling up on the actuating rod forces the grapple sections to close.

6 Claims, 3 Drawing Sheets

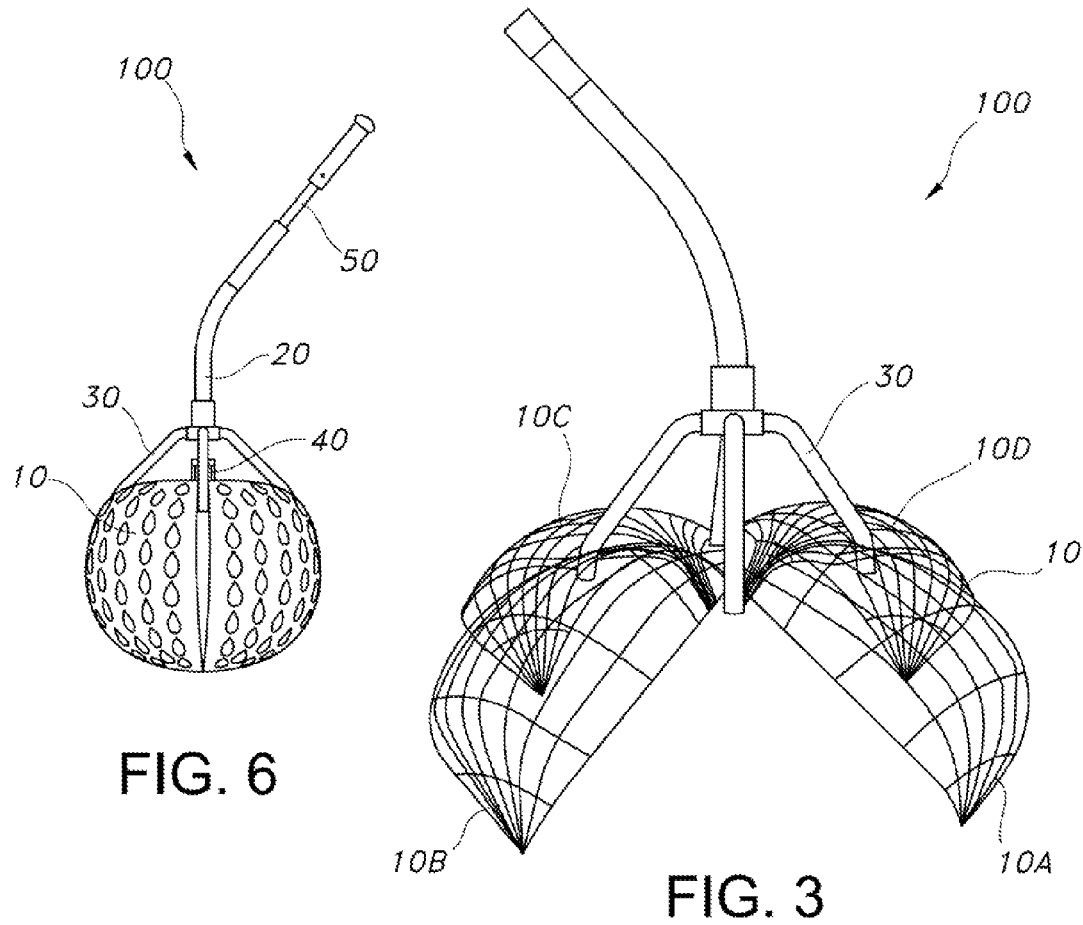
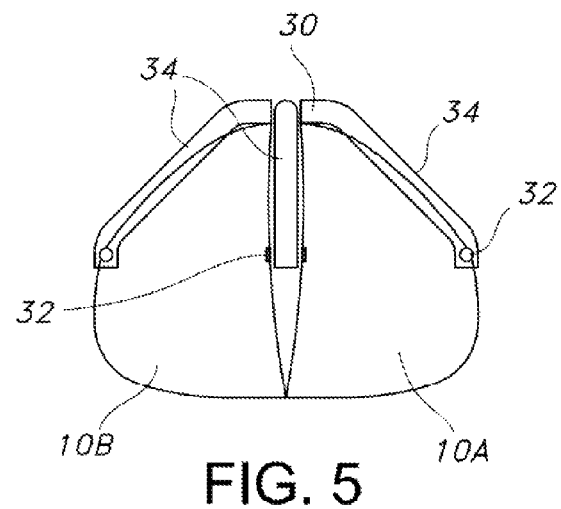

DEVICE FOR PICKING UP LOOSE MATERIAL

BACKGROUND INFORMATION

1. Field of the Invention

The invention relates to a garden implement for picking up leaves and yard debris in general.

2. Description of the Prior Art

Leaves are typically raked up at the end of the fall season as part of yard care. A person rakes the leaves together into a pile. The leaves then have to be transferred to a container, typically a bag, but also to a container to collect the leaves for putting through a mulching machine or for composting. The raking together of the leaves is done in an upright position, but picking up the leaves requires that the person bend over to scoop them up, either with the hands or with some type of scooper. It is often uncomfortable for a person to bend repeatedly and, as a result, leaves are often raked into a pile, but then improperly disposed of because it is too tedious or uncomfortable to pick them up from the ground.

What is needed therefore is a tool or implement that enables a person to easily pick up a bunch of leaves that have been raked into a pile, in order to transfer the leaves to a container or other location. What is further needed is such an implement that is eliminates or reduces the need for the person to have to bend over to the level of the leaves in order to pick them up.

BRIEF SUMMARY OF THE INVENTION

The invention is a leaf grapple that is used to gather up a pile of leaves so as to enable a user to transfer the gathered leaves to a container or other location. The leaf grapple has a sectioned, openable claw that, when open, spreads out over a pile of leaves. The user lowers the grapple over the pile, closes the grapple, thereby scooping up a pile of leaves. The leaves are released from the grapple into a container or compost pile, mulching machine, etc. The grapple is attached to the end of a long handle that enables the user to maintain a substantially upright position while operating the grapple. Assembled in the handle is an actuating mechanism for opening and closing the grapple. Ideally, the mechanism is a push-pull actuator that is simple to use.

It is understood, that the grapple may be used to gather up loose articles other than leaves and that, depending on the intended use of the grapple, the handle may be adapted in length and contour to the particular intended use, or be constructed so as to be adjustable in length.

BRIEF DESCRIPTION OF THE DRAWINGS

The present invention is described with reference to the accompanying drawings. In the drawings, like reference numbers indicate identical or functionally similar elements. The drawings are not drawn to scale.

FIG. 3 shows the leaf grapple in a fully open position.

FIG. 5 shows the outer spider coupled to the side edges of the grapple sections.

FIG. 6 illustrates a variation on the material used for the grapple.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

Figures 1, 2:
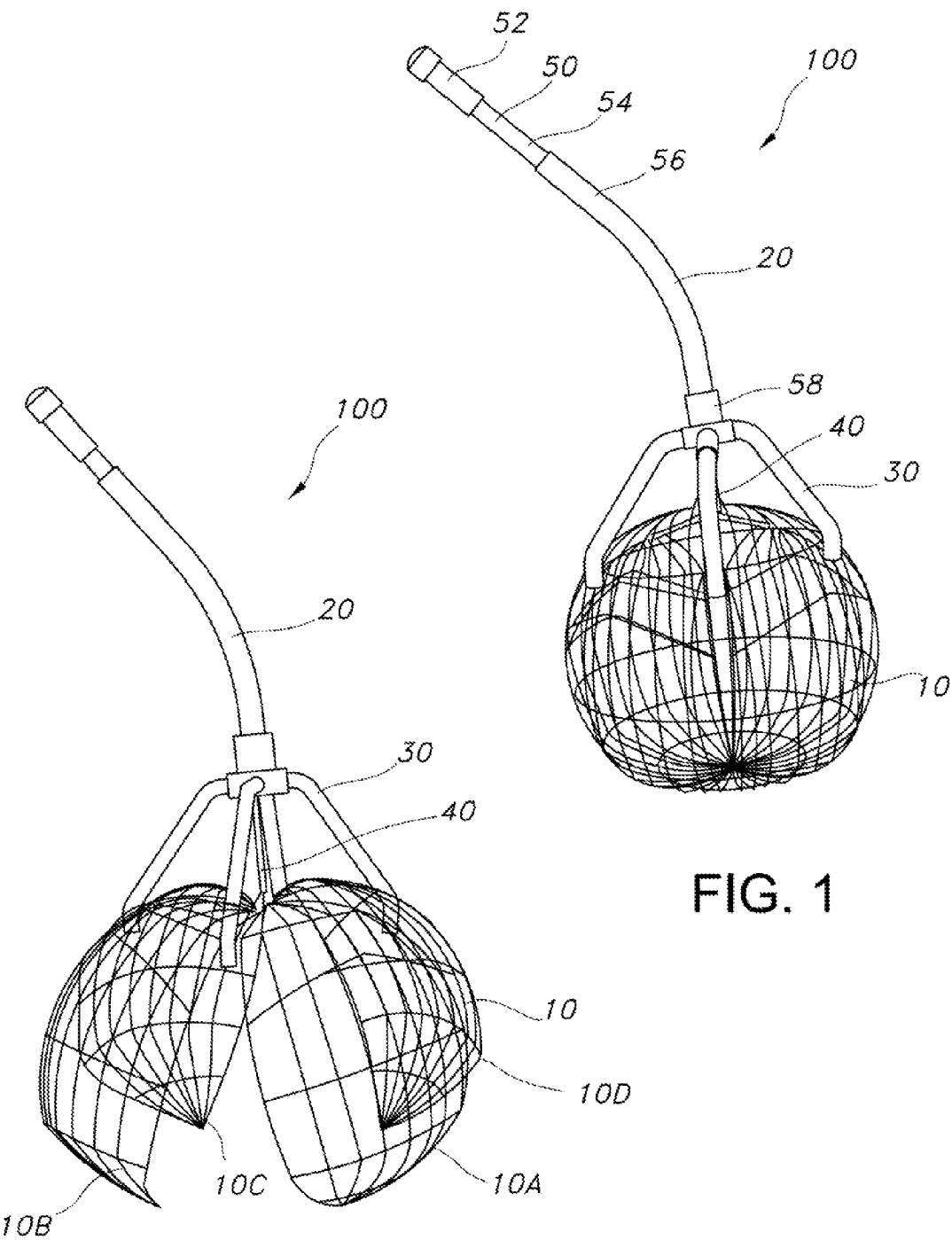
FIG. 1 shows the leaf grapple according to the invention, in its closed position.
FIG. 2 shows the leaf grapple in a partially open position.

FIGS. 1-3 illustrate a grapple 100 according to the invention, in a closed, partially open, and fully open position, respectively. The grapple 100 comprises a grapple basket 10, a handle 20, an outer coupling spider 30, also referred to as a second coupling assembly, an inner coupling spider 40, also referred to as a first coupling assembly, and actuating means 50 for moving the grapple basket 10 between an open and a closed position.

The initial intended use for the inventive device disclosed herein is as a leaf grapple, to pick up leaves that have been gathered into a pile. It is, of course, possible, to use the grapple 100 to pick up various other types of materials, particularly material that is lightweight and loose. In the FIGS., the handle 20 is illustrated with a length that is constructed to allow a person standing in an upright position to operate the grapple 100 as a leaf grapple. The handle 20 may, of course, be constructed in various lengths or have an length-adjustment means, to allow the grapple to be used for other purposes in a convenient manner.

The grapple basket 10 includes a plurality of grapple sections 10A-10D. Four sections are shown in the embodiment illustrated in these drawings, but it is understood that any suitable plurality of sections may be used, as long as there are two or more of them, to provide an openable grapple basket 10. Each section 10A-10D is coupled to the outer spider 30 and to the inner spider 40 by a coupling means 32.

Figure 4:
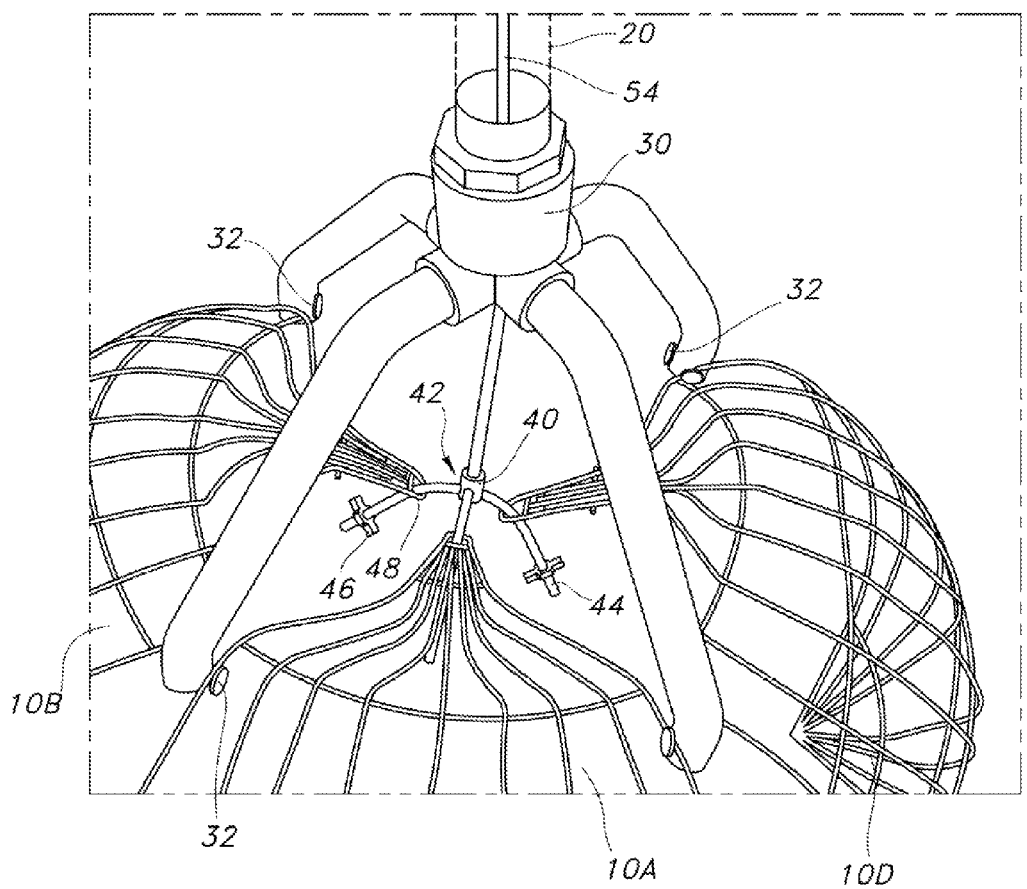
FIG. 4 is a partial illustration of the leaf grapple of FIG. 1, showing the inner spider coupled to upper portions and the outer spider coupled to outer portions of the grapple sections.

FIGS. 4 and 5 illustrate how the inner spider 40 and the outer spider 30 cooperate to manipulate the grapple sections 10A-10D. For purposes of illustration, only three partial grapple sections 10A, 10B and 10D are shown. Each spider 30, 40 has as many arms 34, 44 as there are grapple sections. The coupling means 32 on the outer spider 30 is a pivot pin coupler that is attachable to a side edge of the grapple sections by a snap coupler, at a position that is lower down on the grapple section with regard to the top of the section, best seen in FIG. 5. There are many suitable mechanisms that may be used to attach the side edges of the grapple sections 10A-10D to the outer spider 30, which will allow the grapple section 20 to rotate about the coupling means 32. The inner spider 40 is attached to the actuating means 50 by a spider coupler 42. A limit or stop 46 is optionally fastened to the lower end of each arm 44, to prevent the grapple sections from inadvertently slipping from the arm 44. The upper end of each grapple section has an opening 48 through which the respective arm 44 in inserted. The upper portion of the grapple section is thus movably assembled on the inner spider arm 44. The actuating means 50 includes an actuating rod 54 which is slidably assembled within the handle 20, as best seen in FIG. 1. An upper end of the actuating rod 54 is attached to a grip 52 and a lower end is coupled to the inner spider coupler 42.

Operation of the grappler 100 is as follows: Pushing on the grip 52 causes the actuating rod 54, and consequently, also the inner spider 40 to move a distance away from the lower end of the handle 20. The outer spider 30 is fixed in position relative to the lower end of the handle 20. The downward movement of the inner spider 40 thus forces the grapple sections 10A-10D to swing about the pivot point of the coupling means 32 on the outer spider 30, thereby forcing the grapple sections to open out at the lower end. Conversely, pulling on the grip 52 causes the actuating rod 54 to move upward, thereby pulling the upper portions of the grapple sections 10A-10D closer to the lower end of the handle 20 and forcing the lower portions of the grapple sections to swing inward to a closed position.

The grapple 100 shown in FIGS. 1-3 is constructed of wire mesh. This provides a lightweight device that will also allow water and pebbles to fall through the mesh. The grapple 100 shown in FIG. 6 is constructed of a stamped thermoplastic sheet material that is formed to the desired shape. The handle, the spiders, and actuating rod are made of rigid and rugged plastic, or of metal. It is understood, however, that the materials disclosed herein are not intended to be limiting. The grapple 100 according to the invention may be constructed of various suitable materials.

The grapple 100 according to the invention is lightweight and easy to use. Furthermore, it is economical to manufacture and to ship. The grapple sections are stackable within each other and the various components may be shipped as a disassembled kit, that is readily assemblable without the use of additional tools.

It is understood that the embodiments described herein are merely illustrative of the present invention. Variations in the construction of the grapple may be contemplated by one skilled in the art without limiting the intended scope of the invention herein disclosed and as defined by the following claims.

What is claimed is:

1. A grapple device for picking up a loose material, the grapple device comprising:
   a handle;
   a grapple basket for grabbing the pile of leaves, the grapple basket having two or more grapple sections and being openable and closable;
   an actuating means for moving the grapple sections between open and closed positions;
   a first coupling assembly for attaching to an upper portion of each grapple section; and
   a second coupling assembly for attaching to a portion of each grapple section that is a distance away from the upper portion of the each grapple section;
   wherein the upper portion of the each grapple section is movably assembled on the first coupling assembly;
   wherein the lower portion of the each grapple section is pivotably coupled to the second coupling assembly, and
   wherein, when said actuating means is actuated to open the grapple basket, the upper portion of the each grapple section is pushed downward, thereby forcing the each grapple section to pivot about the second coupling assembly and move to an open position.

2. The grapple device of claim 1, wherein the first coupling assembly is an inner spider that is attached to a lower end of the actuating means, the inner spider having inner spider arms that are coupled with the grapple sections and
   wherein each grapple section of the two or more grapple sections has an upper portion that is movably assembled on a corresponding one of the inner spider arms.

3. The grapple device of claim 1, wherein the second coupling assembly is an outer spider that is assembled at the end of the handle, the outer spider having outer spider arms that couple with grapple sections;
   wherein each grapple section of the two or more grapple sections has two side edges; and
   wherein a lower end of a corresponding one of the spider arms is pivotably coupled to at least one side edge of one of the two or more grapple sections.

4. The grapple device of claim 3, wherein the grapple sections include a first grapple section and an adjacent grapple section, and wherein the lower end of the each outer spider arm is pivotably coupled to a side edge of the first grapple section and a side edge of the adjacent grapple section.

5. The grapple device of claim 1, wherein the two or more grapple sections are constructed of a wire mesh material.

6. The grapple device of claim 1, wherein the two or more grapple sections are constructed of a thermoplastic material.

* * * * *